United States Patent [19]

Menker

[11] Patent Number: 4,884,927
[45] Date of Patent: Dec. 5, 1989

[54] SHIELD UNIT FOR MACHINE TOOL

[76] Inventor: Robert L. Menker, 2560 Celina Rd., St. Marys, Ohio 45885

[21] Appl. No.: 250,540

[22] Filed: Sep. 29, 1988

[51] Int. Cl.[4] .......................... B23C 9/00; B23Q 11/08
[52] U.S. Cl. ............................. 409/134; 29/DIG. 34; 51/272; 144/251 A; 408/241 G
[58] Field of Search .............................. 409/134, 219; 408/241 G, 67; 144/251 A; 74/608, 609, 614; 29/DIG. 50, DIG. 56, DIG. 94; 51/272, 274; 83/860

[56] References Cited

U.S. PATENT DOCUMENTS

| D. 273,497 | 4/1984 | Steineman | D15/138 |
|---|---|---|---|
| 596,762 | 1/1898 | Sevison | 51/272 |
| 1,148,397 | 7/1915 | Nelson | 409/134 |
| 1,527,998 | 3/1925 | Serpico | 409/134 |
| 1,563,887 | 12/1925 | Wiespetat | 408/710 X |
| 1,580,903 | 4/1926 | Kelleher | 51/272 |
| 2,165,142 | 7/1939 | Jeffreys | 74/609 X |
| 3,837,383 | 9/1974 | Ko | 144/251 A |
| 4,024,674 | 5/1977 | Suzuki | 51/272 X |
| 4,043,701 | 8/1977 | Jaeger | 408/241 G |
| 4,132,497 | 1/1979 | Weller et al. | 408/241 G |
| 4,162,647 | 7/1979 | Aslen | 409/134 |
| 4,290,717 | 9/1981 | Aslen | 408/241 G |
| 4,484,845 | 11/1984 | Pennella, Jr. et al. | 409/134 |
| 4,543,021 | 9/1985 | Adler | 409/134 |
| 4,552,494 | 11/1985 | Wix | 408/67 |

Primary Examiner—Z. R. Bilinsky
Attorney, Agent, or Firm—Jacox & Meckstroth

[57] ABSTRACT

A shield unit which is removably attachable to a machine tool having a cutting member. A rigid transparent sheet is attached to an elongate stem. Also attached to the elongate stem is a clamp. The clamp is adapted to be removably attached to a portion of the machine tool. With the clamp attached to a portion of the machine tool, the transparent sheet is positioned adjacent a cutting member of the machine tool to protect the operator of the machine tool. Preferably, the machine tool is provided with a threaded rod such as a spindle adjustment rod, and the clamp has a threaded portion which threadedly engages the threaded rod to secure the position of the clamp with respect to the threaded rod and to secure the position of the transparent sheet with respect to the cutting member.

14 Claims, 1 Drawing Sheet

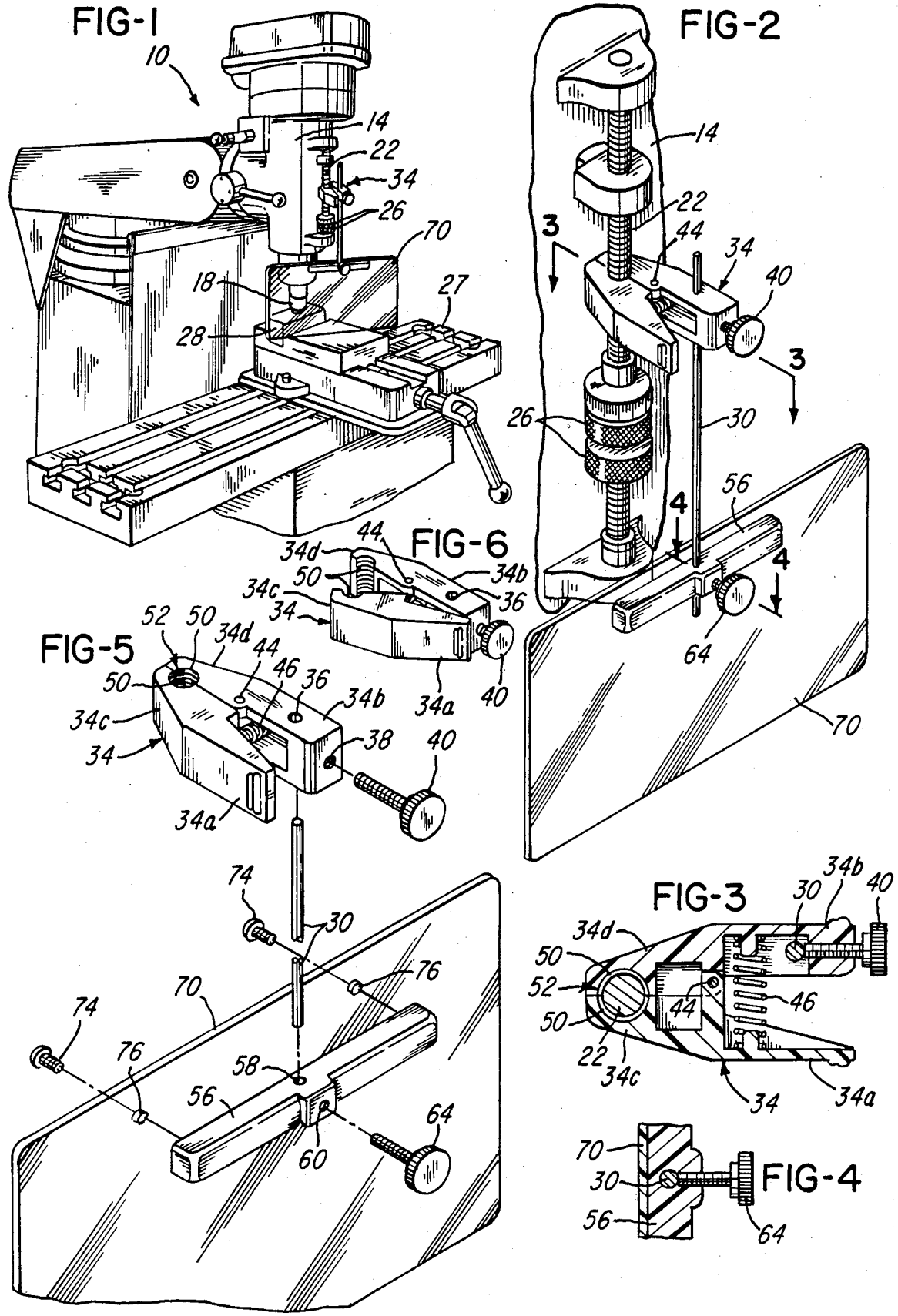

SHIELD UNIT FOR MACHINE TOOL

BACKGROUND OF THE INVENTION

During use of several types of machine tools the operator is subjected to flying chips, particles, and the like which travel from the cutting tool and from the work piece toward the operator.

It is an object of this invention to provide a shield unit which can be easily and quickly attached to a machine tool for protection of the operator from flying particles, such as chips and the like.

It is another object of this invention to provide such a shield unit which can be easily adjusted.

It is another object of this invention to provide such a shield unit which is constructed of durable materials which are relatively light in weight.

The following U.S. Pat. show various types of shields for machine tools U.S. Pat. Nos.: 1,527,998, 1,563,887, 3,837,383, 4,043,701, 4,132,497, 4,290,717, and 4,552,494. However, none of these shields is similar to the shield unit of this invention.

Other objects and advantages of this invention reside in the construction of parts, the combination thereof, the method of production and the mode of use, as will become more apparent from the following description.

SUMMARY OF THE INVENTION

A machine tool has a cutting member which is used for cutting metal and/or wood materials. As the materials are cut, chips and other particles fly from the work and from the cutting member.

This invention comprises a shield unit which includes a transparent sheet. The transparent sheet is attached to a stem. Also attached to the stem is a clamp which is adapted to be quickly and easily attached to a portion of the machine tool. The clamp and the transparent sheet are adjusttably attached to the stem. The transparent sheet is positioned between the cutting member and the operator, and serves as a shield for protection of the operator and to permit the operator to more advantageously operate the machine tool.

The shield unit is particularly adapted for use with a machine tool that has a threaded spindle adjustment screw or rod. Preferably the clamp of the shield unit has a threaded clamp portion which is complementary to the threaded spindle adjustment rod and is attachable thereto.

BRIEF DESCRIPTION OF THE VIEWS OF THE DRAWING

FIG. 1 is a fragmentary perspective view of a typical machine tool, with a shield unit of this invention attached thereto.

FIG. 2 is an enlarged fragmentary perspective view showing the shield unit attached to the machine tool.

FIG. 3 is an enlarged sectional view taken substantially on line 3—3 of FIG. 2.

FIG. 4 is an enlarged fragmentary sectional view taken substantially on line 4—4 of FIG. 2.

FIG. 5 is an exploded perspective view, with parts broken away, of a shield unit of this invention.

FIG. 6 is a perspective view of the clamp of the shield unit of this invention, as the clamp is in an open position.

DETAILED DESCRIPTION OF THE PREFERRED EMBODIMENT

FIG. 1 illustrates a typical machine tool 10, such as a milling machine, or the like. The machine tool 10 has a head portion 14. Below the head portion 14 is a cutting member 18.

Mounted upon the head portion 14 is a spindle adjustment screw or rod 22. The spindle adjustment rod 22 is threaded. Threadedly attached to the spindle adjustment rod 22 is a plurality of adjustment nuts 26. The machine tool 10 is shown as having a table 27 upon which is a work piece 28.

The shield unit of this invention includes an elongate stem 30. At the upper portion of the stem 30 is a clamp 34. The clamp 34 has grip portions 34a and 34b. The clamp 34 has clamping portions 34c and 34d. The clamp 34 is preferably similar to that shown in U.S. Pat. No. Des. 273,497.

The stem 30 extends into a passage 36 in the grip portion 34b of the clamp 34. A passage 38, in the grip portion 34b is substantially normal to the passage 36 and is threaded. The passage 38 joins the passage 36. A threaded clamping screw 40 is positioned within the threaded passage 38 and engages the stem 30 to secure the position of the stem 30 with respect to the clamp 34.

A pin 44 pivotally attaches together the grip portions 34a and 34b. A spring 46 is positioned adjacent the pin 44 and urges the grip portions 34a and 34b, one from the other. The spring 46 urges the clamping portions 34c and 34d together. Each of the clamping portions 34c and 34d has an arcuate threaded part 50, as best shown in FIG. 6. Thus, when the portions 34c and 34d are together, as shown in FIG. 5, a threaded opening 52 exists in the clamping portions 34c and 34d. The threaded opening 52 has a diameter which is substantially equal to the diameter of the threaded spindle adjustment rod 22 of the machine tool 10. The threads of the threaded opening 52 are similar to the threads of the threaded spindle adjustment rod 22.

At the lower part of the stem 30 is a bracket 56, which has a passage 58 therethrough. Substantially normal to the passage 58 is a threaded passage 60. The passage 60 joins the passage 58. The stem 30 extends into the passage 58. A threaded clamping screw 64 is positioned within the threaded passage 60 and engages the stem 30 and secures the position of the stem 30 with respect to the bracket 56.

The bracket 56 is attached by any suitable means to a rigid transparent sheet 70. Herein screws 74 are shown extending through holes 76 in the transparent sheet 70 and into the bracket 56, thus attaching the transparent sheet 70 to the bracket 56.

In the use of a shield unit of this invention, the clamp 34 is preferably attached to the threaded spindle adjustment rod 22 of the machine tool 10. The arcuate threaded parts 50 engage the threaded spindle rod 22 so that the threaded spindle rod 22 is within the threaded opening 52 in the clamping portions 34c and 34d of the clamp 34.

As the stem 30 extends downwardly from the clamp 34, the rigid transparent sheet 70 is positioned adjacent the work piece 28. The transparent sheet is positioned between the cutting member 18 and an operator of the machine tool 10. The cutting member 18 is shown in FIG. 1 in cutting position with respect to the work piece 28. Thus, the transparent sheet 70 serves as a shield to protect the operator of the machine tool 10, thus protecting the operator from flying chips and other particles which travel from the work piece 28.

The clamp 34 can be easily and quickly attached to the spindle adjustment rod 22 and detached therefrom. The position of the clamp 34 with respect to the stem 30 is adjusted by use of the clamping screw 40. The position of the transparent sheet 70 with respect to the stem 30 is adjusted by use of the clamping screw 64. As stated above, the threads in the threaded opening 52 in the clamp 34 are complementary to the threads on the threaded spindle adjustment rod 22. Thus, the threaded parts 50 of the clamp 34 firmly engage the threaded spindle adjustment rod 22, and the clamp 34 is securely attached to the threaded spindle adjustment rod 22.

Although the preferred embodiment of the shield unit of this invention has been described, it will be understood that within the purview of this invention various changes may be made in the form, details, proportion and arrangement of parts, the combination thereof, and the mode of use, which generally stated consist in a shield unit for machine tool within the scope of the appended claims.

The invention having thus been described, the following is claimed:

1. A shield unit for attachment to a machine tool which is provided with a cutting member in which an operator of the machine tool is positioned adjacent the cutting member as the cutting member cuts a work piece, the machine tool also being provided with a threaded rod, comprising an elongate stem, a clamp, the clamp having movable clamp portions, each clamp portion having a threaded part, means attaching the clamp to the stem, a rigid transparent sheet, and means attaching the rigid transparent sheet to the stem, whereby the threaded parts of the movable clamp portions of the clamp are clampingly attached to the threaded rod, and the rigid transparent sheet is positioned adjacent the cutting member and between the cutting member and an operator of the machine tool as the rigid transparent sheet serves as a shield to protect the operator of the machine tool.

2. The shield unit of claim 1 which includes means adjustably attaching the clamp to the stem.

3. The shield unit of claim 1 which includes means adjustably attaching the rigid transparent sheet to the stem.

4. The shield unit of claim 1 in which the clamp has a passage, a portion of the stem being positioned within the passage, a clamping screw extending into the passage and engaging the stem and maintaining the position of the stem with respect to the clamp.

5. The shield unit of claim 1 which includes a bracket attached to the transparent sheet, the bracket having a passage therein, the stem having a portion within the passage, a clamping screw having a part within the passage and in engagement with the stem and securing the position of the stem with respect to the bracket and the transparent sheet.

6. The shield unit of claim 1 in which the thread parts of the clamping portions of the clamp are complementary to the threads of the threaded rod of the machine tool, whereby the threaded parts of the clamp portions of the clamp are positioned in meshed relationship with the threaded rod as the clamp is attached to the threaded rod.

7. The shield unit of claim 1 in which the threaded rod has a given diameter, and in which the threaded parts of the clamp portions of the clamp are arcuate and together form an opening which is substantially equal to the given diameter of the threaded rod.

8. The shield unit of claim 1 in which the threaded rod has a given diameter, and in which the threaded parts of the clamp portions of the clamp when together form an opening which is substantially equal to the given diameter of the threaded rod and in which the threads of the threaded parts of the clamp portions of the clamp are complementary to the threads of the threaded rod of the machine tool, whereby the threaded parts of the clamp portions of the clamp encompass the threaded rod and are in meshed relationship with the threaded rod as the clamp is attached to the threaded rod.

9. A shield unit for a machine tool which has a threaded spindle adjustment rod, and a cutting member, the machine tool being adapted to be operated by an operator who is adjacent the cutting member, the threaded spindle adjustment rod having a given diameter and having threads of a given size and spacing, comprising an elongate stem, a clamp, means attaching the clamp to the elongate stem, the clamp being provided with a pair of relatively movable portions, each of the movable portions having an arcuate threaded surface, the arcuate threaded surface being complementary to the curvature of the threaded rod and the threads thereof, the movable portions of the clamp being movable to place the arcuate threaded surfaces in juxtaposition, whereby a threaded opening is established in which the threaded opening has a diameter substantially equal to the diameter of the threaded spindle adjustment rod, the movable portions being movable to engage and encompass the threaded spindle adjustment rod of the machine tool, to attach the clamp to the threaded spindle adjustment rod, a transparent sheet, means attaching the transparent sheet to the elongate stem, whereby the clamp when attached to the threaded spindle adjustment rod maintains the stem and the transparent sheet in a position adjacent the cutting member for protection of an operator of the machine tool.

10. The shield unit of claim 9 which includes means adjustably attaching the clamp to the elongate stem.

11. The shield unit of claim 9 which includes means adjustably attaching the rigid transparent sheet to the elongate stem.

12. The shield unit of claim 9 which includes resilient means urging the movable portions of the clamp into juxtaposition.

13. The shield unit of claim 9 in which the transparent sheet is of rigid material.

14. A shield unti for attachment to a machine tool which is provided with a cutting member and in which an operator of the machine tool is positioned adjacent the cutting member as the cutting member cuts a work piece, the machine tool also being provided with a threaded rod, comprising a clamp, the clamp having a plurality of clamp parts, each of the clamp parts being movable, each of the clamp parts having an arcuate clamp portion, the arcuate clamp portion of at least one of the clamp parts having a threaded surface, the clamp parts being relatively movable to threadedly clampingly attach the clamp to the threaded rod and to release and to remove the clamp from the threaded rod, an elongate stem, means attaching the elongate stem to the clamp, a rigid transparent sheet, and means attaching the rigid transparent sheet to the elongate stem, whereby the clamp, including each clamp part having a threaded surface, is threadedly clampingly attached to the threaded rod, and the rigid transparent sheet is positioned adjacent the cutting member and between the cutting member and an operator of the machine tool as the rigid transparent sheet serves as a shield to protect the operator of the machine tool.

* * * * *